US007133369B1

(12) United States Patent
Kennamer et al.

(10) Patent No.: US 7,133,369 B1
(45) Date of Patent: Nov. 7, 2006

(54) SYSTEM AND METHOD FOR DYNAMIC CACHING OF DATA CONNECTIONS

(75) Inventors: Walter Kennamer, Issaquah, WA (US); Keith Kaplan, Bothell, WA (US)

(73) Assignee: Microsoft Corporation, Redmond, WA (US)

(*) Notice: Subject to any disclaimer, the term of this patent is extended or adjusted under 35 U.S.C. 154(b) by 966 days.

(21) Appl. No.: 10/127,076

(22) Filed: Apr. 19, 2002

(51) Int. Cl.
H04J 1/16 (2006.01)
H04J 3/14 (2006.01)
(52) U.S. Cl. .................. 370/254; 370/468; 709/203
(58) Field of Classification Search ............ 370/486, 370/468, 465, 342, 442, 461, 462, 351, 352, 370/229, 230, 231, 445, 441, 230.1, 252, 370/254, 447, 449, 444; 709/203
See application file for complete search history.

(56) References Cited

U.S. PATENT DOCUMENTS 5,231,631 A * 7/1993 Buhrke et al. ............. 370/230
5,638,371 A * 6/1997 Raychaudhuri et al. .... 370/310.2
6,154,444 A * 11/2000 Masuo et al. ............... 370/225
6,973,037 B1 * 12/2005 Kahveci ...................... 370/236

* cited by examiner

Primary Examiner—Ajit Patel
(74) Attorney, Agent, or Firm—Christsensen O'Connor Johnson Kindness PLLC

(57) ABSTRACT

An integrated network and method for managing cached connections are provided. The integrated network includes one or more Web server clients in communication with one or more data servers that allow the Web server clients to request data over a communication channel. To facilitate repeated data requests, an individual Web server client requests that one or more communication channels be cached. The data server processes the Web server client request based on varying criteria. Upon the instantiation of a cached connection, both the Web server client and the data server may maintain the cached connections.

31 Claims, 12 Drawing Sheets

| SOCKET IDENTIFICATION | IN USE | TIME STAMP |
|---|---|---|
| XXXXXX | X | XXXX |
| XXXXXX |  | XXXX |
| XXXXXX | X | XXXX |
| XXXXXX | X | XXXX |

Fig. 7.

SYSTEM AND METHOD FOR DYNAMIC CACHING OF DATA CONNECTIONS

FIELD OF THE INVENTION

In general, the present invention relates to computer software and data networks, and in particular, to a system and method for dynamically managing data connections in a communication network.

BACKGROUND OF THE INVENTION

The continued development of computing devices, such as personal computers ("PCs") and global communication networks, such as the Internet, provides a computer user a number of advantages. In common Internet environment, a computer user, through a user computing device, requests specific content from content-providing computing devices, such as server computing devices, connected to the Internet. As the content-providing computing devices transmit the data, the user computing device generates pages of graphical and textual data that can be displayed to the individual computer user. This embodiment is generally referred to as the World Wide Web ("WWW" or "Web").

In some embodiments, a single service provider can support several content-providing devices that are organized by a topic that each device provides. For example, the single service provider may provide content-providing computing devices that provide weather information, financial information, electronic communication, chat room hosting, sports information and the like. Accordingly, a user request for information from the service provider will be directed to and serviced by a specific content-providing computing device. Accordingly, the user experience can be measured in terms of the specific computing device's ability to process the user request in an efficient and complete manner.

To facilitate a better user experience, many content-providing computing devices attempt to customize at least a portion of the data returned to the computer user. In a typical embodiment, the user request can include some identification information, such as a user identifier or user demographic information, that allows the content-providing computing device to modify the content for a particular user. For example, user demographic information indicating a zip code for a user allows the content-providing computing device to modify content for the particular geographic area of the user. Likewise, a travel-based content provider may be able to modify content to include previous trip information, user travel preferences or financial information for purchases corresponding to a particular identifiable user.

Although the content-providing computing device can maintain some or all of the user information for customizing content, this approach quickly becomes inefficient for a larger number of user requests. For example, one typical implementation, a service provider may utilize a number of content-providing computing devices to server user computer requests. Accordingly, in some embodiments, several content-providing computing devices can share a common set of data that is typically stored in one or more databases. In accordance with one embodiment utilizing a common set of data, each individual content-providing device can access the data directly from the databases. However, as the amount of data stored in the database increases, database access time increases. Accordingly, the overall performance of the content-providing computing device decreases.

One attempt to improve data access times includes the use of one or more data servers optimized to retrieve requested data from the large database banks. In accordance with this embodiment, each content-providing computing device becomes a client of a data server and requests the data from the data server. For ease of explanation, the content-providing computing devices that request data from data servers will be referred to as "clients" or "client computing devices." In some instances, the data server can maintain the data locally and the response time is greatly improved. In other instances, the data server may have to access the database. However, the group of data servers may be configured so that each data server can retrieve a portion of the data much faster. Accordingly, a particular client request, including some type of identification information, can be directed to an appropriate data server.

Although the utilization of a data server configuration can improve data access times, current data server and client configurations can become inefficient in processing repeated user requests. In the typical data server and client configuration, the client issues a communication request to open a communication channel with the data server. In turn, the data server acknowledges the communication channel request. Upon completion of the data transfer, the client issues a request to terminate the communication channel. Accordingly, each data request includes three additional transactions to coordinate communication channels. As the number of data requests between a client and a data server increases, the three additional transactions utilize system resources and decrease system performance.

To mitigate the number of additional transactions, the data server can allow the client to make the communication channel persistent such that subsequent data requests can be transferred over the persistent communication channel without requiring the three additional transactions. The maintenance of persistent communication channels can be referred to as communication channel caching. Although communication channel caching can improve system performance, current caching embodiments can become deficient in managing how many communication channels are cached. More specifically, often a data server can service any number of clients that can have varying data request loads. For example, a chat room client may have a lower request load during the morning than in the afternoon. Likewise, another client may wish to pay higher service costs to achieve better performance in terms of more allowed cached connections.

Current data server caching systems are typically limited to providing each client with a fixed number of cached communication channels, even if they are not being utilized at that time. Accordingly, the data server may have to maintain cached communication channels with a client, even if the communication channel isn't being utilized. Likewise, certain clients may experience severe performance degradation during limited times, such as during a peak usage span, that could be greatly improved with more cached connections. In both above-referenced examples, a fixed number of allowed cached communication channels may be inefficient for certain situations.

Accordingly, based on the above-described deficiencies associated with the prior art, there is a need for a system and method for managing communication channels allocations.

SUMMARY OF THE INVENTION

An integrated network and method for managing cached connections are provided. The integrated network includes one or more Web server clients in communication with one or more data servers that allow the Web server clients to request data over a communication channel. To facilitate repeated data requests, an individual Web server client requests that one or more communication channels be cached. The data server processes the Web server client request based on varying criteria. Upon the instantiation of a cached connection, both the Web server client and the data server may maintain the cached connections.

In accordance with the present invention, a method for managing persistent communication connections between a client computing device and a data server is provided. The method may be implemented in an integrated data network including one or more client computing devices in communication with one or more data servers. In accordance with the present invention, a data server obtains a request to establish a persistent communication channel and calculates a number of persistent communication channels including any existing persistent communication channels and the requested persistent communication channel. The data server determines whether the number of requested persistent communication channels will exceed a threshold number of persistent communication channels between the data server and the client computing device. Additionally, the data server establishes a persistent communication channel if the requested persistent communication channel will not exceed the threshold number of persistent communication channels.

In accordance with another aspect of the present invention, an integrated data network for managing persistent communication channels is provided. The integrated data network includes one or more client computing devices operable to generate data requests corresponding to an identifiable set of data over a communication channel. The integrated data network also includes one or more data servers, in communication with the one or more client computing devices, and operable to process the client computing device requests according to the identifiable set of data. The one or more client computing devices are further operable to request a communication channel with a data server remain persistent. Additionally, the one or more data servers are further operable to calculate a number of persistent communication channels including any existing persistent communication channels and the requested persistent communication channel, determine whether the number of persistent communication channels will exceed a threshold number of persistent communication channels, and establish a persistent communication channel if the number of persistent communication channels will not exceed a threshold number of persistent communication channels.

In accordance with still a further embodiment of the present invention, a method for managing cached communication connections between a client computing device and a data server is provided. The method may be implemented in an integrated data network including one or more client computing devices in communication with one or more data servers. In accordance with the method a client computer issues a request to establish a cached communication channel. A data server obtains the request to establish a cached communication channel and calculates a number of cached communication channels including any existing cached communication channels and the requested cached communication channel. The data server determines whether the number of requested cached communication channels will exceed a threshold number cached communication channels between the data server and the client computing device and transmits a notification of a granted cached communication channel if the number of requested cached communication channels will not exceed a threshold number of cached communication channels between the data server and the client computing device.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein:

FIG. 7 is a block diagram illustrative of a cache connection array utilized by a Web server client to manage cache connections with a data server in accordance with the present invention;

DETAILED DESCRIPTION OF THE PREFERRED EMBODIMENT

Figure 12:
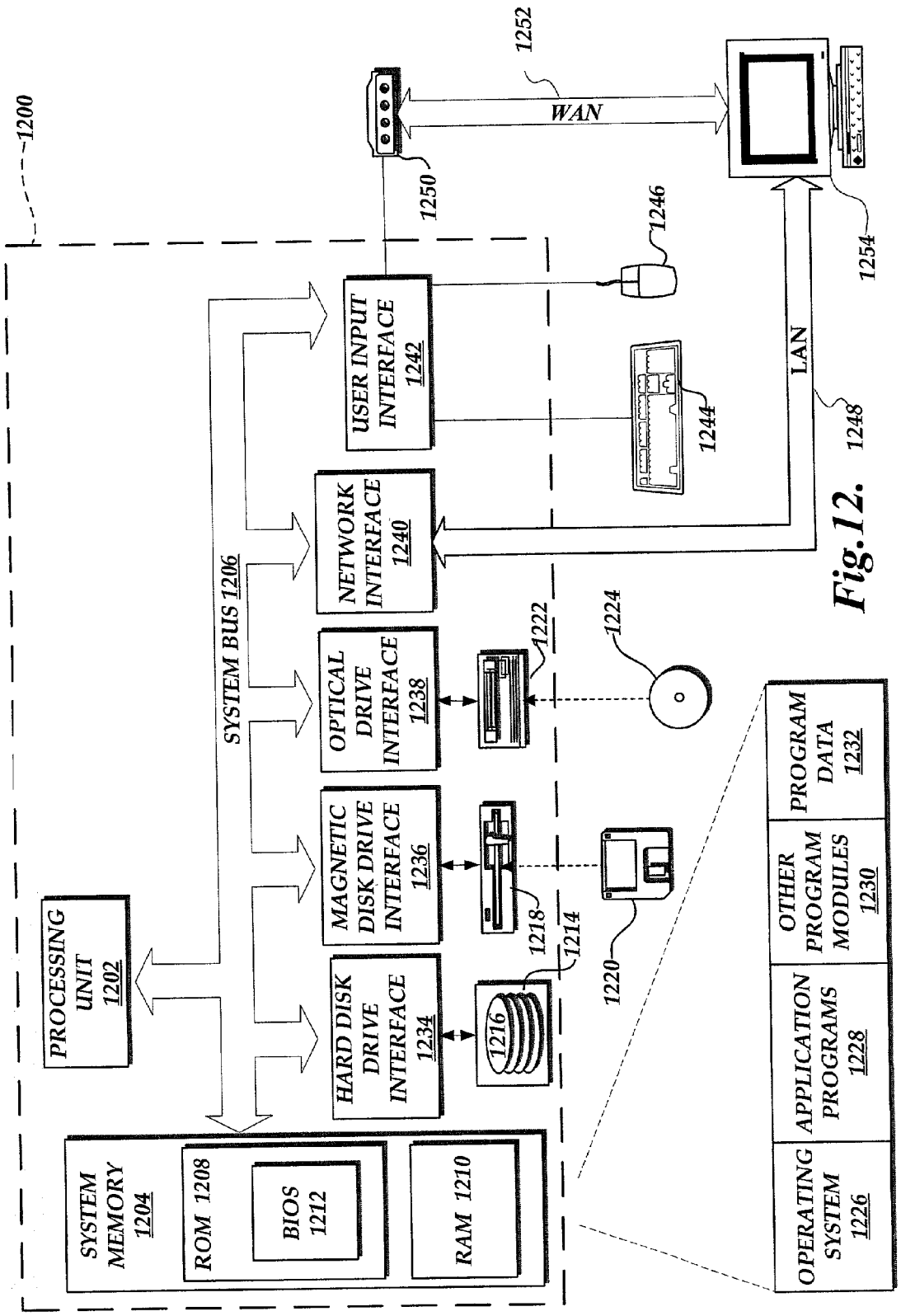
FIG. 12 is a block diagram illustrative of a computer system suitable for implementing the present invention.

FIG. 12 illustrates an example of a suitable computing system environment in which the invention may be implemented. The computing system environment is only one example of a suitable computing environment and is not intended to suggest any limitation as to the scope of use or functionality of the invention; neither should the computing environment be interpreted as having any dependent requirement relating to any one or combination of components illustrated in the exemplary operating environment.

The invention is operational in numerous other general purpose or special computing system environments or configurations. Examples of well known computing systems, environments, and/or configurations that may be suitable for implementing the invention include, but are not limited to personal computers, server computers, laptop devices, multiprocessor systems, microprocessor-based systems, network PCs, minicomputers, mainframe computers, distributed computing environments that include any of the above systems or the like.

The invention may be described in the general context of computer-executable instructions, such as program modules, being executed by a computer. Generally, program modules include routines, programs, objects, components, data structures, etc. that perform a particular task or implement particular abstract data types. The invention may be also practiced in distributed computing environments where tasks are performed by remote processing devices that are linked through a communications network. In a distributed computing environment, program modules may be located in both local and remote computer storage media including memory storage devices.

With reference to FIG. 12, an exemplary system for implementing the invention includes a general purpose computing device in the form of a computer 1200. Components of a computer 1200 include, but are not limited to, a processing unit 1202, a system memory 1204, and a system bus 1206 that couples various system components including the system memory to the processor. The system bus may be any of several types of bus structures including a memory bus or memory controller, peripheral bus, and a local bus using any of a variety of bus architectures. By way of example, not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as a Mezzanine bus.

The computer 1200 typically includes a variety of computer-readable media. Computer-readable media can be any available media that can be accessed by the computer 1200 and includes both volatile and non-volatile media, removable and non-removable media. By way of example, and not limitation, computer-readable media may comprise computer storage media and communication media. Computer storage media includes, but is not limited to, RAM, ROM, EEPROM, flash memory or other memory technology, CD-ROM, Digital Versatile Disk (DVD) or other optical disk storage, magnetic cassettes, magnetic tape, magnetic disk storage or other magnetic storage devices, or any other medium which can be used to store the desired information and which can be accessed by the computer 1200.

The communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner to encode information in the signal. By way of example, and not limitation, communication media includes wired media such as a wired network or direct wired connection, and wireless media such as acoustic, RF, infrared and other wireless media. Combinations of any of the above should also be included within the scope of computer-readable media.

The system memory 1204 includes computer storage media in the form of volatile and/or non-volatile memory such as read only memory (ROM) 1208 and random access memory (RAM) 1210. A basic input/output system 1212 (BIOS), containing the basic routines that help to transfer information between elements within the computer 1200, such as during start-up, is typically stored in ROM 1208. RAM 1210 typically contains data and/or program modules that are immediately accessible to and/or presently being operated on by the processing unit 1202. By way of example, and not limitation, FIG. 12 illustrates an operating system 1226, application programs 1228, other program modules 1230, and program data 1232.

The computer 1200 may also include removable/non-removable, volatile/non-volatile computer storage media. By way of example only, FIG. 12 illustrates a hard disk drive 1214 that reads from or writes to non-removable, non-volatile magnetic media 1216, a magnetic drive 1218 that reads from or writes to a removable, non-volatile magnetic disk 1220, and an optical disk drive 1222 that reads from or writes to a removal, non-volatile optical disk 1224, such as CD-ROM, or other optical media. Other removable/non-removable, volatile/non-volatile computer storage media that can be used in the exemplary operating environment include, but are not limited to, magnetic tape cassettes, flash memory cards, DVD, digital video tape, Bernoulli cap cartridges, solid state RAM, solid state ROM, and the like. The hard disk drive 1214, magnetic disk drive 1218, and optical disk drive 1222 may be connected to the system bus 1206 by a hard disk drive interface 1234, a magnetic disk drive interface 1236, and an optical drive interface 1238, respectively. Alternatively, the hard disk drive 1214, magnetic disk drive 1218, and optical disk drive 1222 are typically connected to the system bus 1206 by a Small Computer System Interface (SCSI).

The drives and their associated computer storage media discussed above and illustrated in FIG. 12, provide storage of computer-readable instructions, data structures, program modules and other data for the computer 1200. In FIG. 12, for example, the hard disk drive 1234 is illustrated as storing the operating system 1226, application programs 1228, other programs 1230, and program data 1232. Note that these components can either be the same as or different from the operating system 1226, the other program modules 1230, and the program data 1232. A user may enter commands and information into the computer 1200 through an input device such as a keyboard 1244 and/or a pointing device 1246, commonly referred to as a mouse, track ball or touch pad. Other input devices (not shown) may include a microphone, a joystick, a game pad, a satellite dish, a scanner, or the like. These and other input devices are often connected to the processing unit 1202 through user input interface 1242 and may be connected by other interface and bus structures, such as a parallel port, game port or other universal serial bus (USB).

The computer 1200 may operate in a network environment using logical connections to one or more remote computers 1254. The remote computer 1254 may be a personal computer, a server, a router, a network PC, a peer device or other common network node, and typically includes many or all of the elements described above relative to the computer 1200, although only a memory storage device has been illustrated in FIG. 12. The logical connections depicted in FIG. 12 include a local area network (LAN) 1248 and a wide area network (WAN) 1252, but also include other networks. Such network environments are commonplace in office, enterprise-wide computer networks, Intranets, and the Internet.

When used in a LAN network environment, the computer 1200 is connected to the LAN 1248 through a network interface adapter 1240. When used in a WAN network environment, the computer typically includes a modem 1250 or other means for establishing communications over the WAN 1252, such as the Internet. The modem, which may be internal or external, may be connected to the system bus 1206 via the serial port interface or other appropriate mechanism. In a networked environment, program modules depicted relative to the computer 1200, or portions thereof, may be stored in the remote memory storage device. By way of example, and not limitation, FIG. 12 illustrates remote application programs 1228 as residing on memory device 1204. It will be appreciated that the network connections shown are exemplary in other means of establishing communication between the computers may be used. Although many other internal components of the computer 1200 are not shown, those of ordinary skill will appreciate that such components and their interconnection are well known. Accordingly, additional details concerning the internal construction of the computer 1200 need not be disclosed in connection with the present invention.

Those skilled in the art will understand that program modules such as the operating system 1226, the application programs 1228 and data 1232 are provided to the computer 1200 via one of its memory storage devices, which may include ROM 1208, RAM 1210, hard disk drive 1214, magnetic disk drive 1218, or optical disk device 1222. The hard disk drive 1214 is used to store data 1232 and the programs, including the operating system 1226 and application programs 1228.

When the computer 1200 is turned on or reset, the BIOS 1212, which is stored in ROM 1208 instructs the processing unit 1202 to load the operating system 1226 from the bard disk drive 1214 into the RAM 1210. Once the operating system 1226 is loaded into RAM 1210, the processing unit executes the operating system code and causes the visual elements associated with the user interface of the operating system to be displayed on the monitor. When a user opens an application program 1228, the program code and relevant data are read from the hard disk drive and stored in RAM 1210.

As described above, aspects of the present invention are embodied in a World Wide Web ("WWW") or ("Web") site accessible via the Internet. As is well known to those skilled in the art, the term "Internet" refers to the collection of networks and routers that use the Transmission Control Protocol/Internet Protocol ("TCP/IP") to communicate with one another. In accordance with an illustrative embodiment of the Internet, a plurality of local LANs and a WAN can be interconnected by routers. The routers are special purpose computers used to interface one LAN or WAN to another. Communication links within the LANs may be wireless, twisted wire pair, coaxial cable, or optical fiber, while communication links between networks may utilize 56 Kbps analog telephone lines, 1 Mbps digital T-1 lines, 45 Mbps T-3 lines or other communications links known to those skilled in the art. Furthermore, computers and other related electronic devices can be remotely connected to either the LANs or the WAN via a digital communications device, modem and temporary telephone, or a wireless link. The Internet has recently seen explosive growth by virtue of its ability to link computers located throughout the world. As the Internet has grown, so has the WWW.

As is appreciated by those skilled in the art, the WWW is a vast collection of interconnected or "hypertext" documents written in HyperText Markup Language ("HTML"), or other markup languages, that are electronically stored at or dynamically generated by "WWW sites" or "Web sites" throughout the Internet. Additionally, client-side software programs that communicate over the Web using the TCP/IP protocol are part of the WWW, such as JAVA® applets, instant messaging, e-mail, browser plug-ins, Macromedia Flash, chat and others. Other interactive hypertext environments may include proprietary environments such as those provided by an number of online service providers, as well as the "wireless Web" provided by various wireless networking providers, especially those in the cellular phone industry. It will be appreciated that the present invention could apply in any such interactive communication environments, however, for purposes of discussion, the Web is used as an exemplary interactive hypertext environment with regard to the present invention.

A Web site is a server/computer connected to the Internet that has massive storage capabilities for storing hypertext documents and that runs administrative software for handling requests for those stored hypertext documents as well as dynamically generating hypertext documents. Embedded within a hypertext document are a number of hyperlinks, i.e., highlighted portions of text which link the document to another hypertext document possibly stored at a Web site elsewhere on the Internet. Each hyperlink is assigned a Uniform Resource Locator ("URL") that provides the name of the linked document on a server connected to the Internet. Thus, whenever a hypertext document is retrieved from any web server, the document is considered retrieved from the World Wide Web. Known to those skilled in the art, a web server may also include facilities for storing and transmitting application programs, such as application programs written in the JAVA® programming language from Sun Microsystems, for execution on a remote computer. Likewise, a web server may also include facilities for executing scripts and other application programs on the web server itself.

A remote access user may retrieve hypertext documents from the World Wide Web via a web browser program. A web browser, such as Netscape's NAVIGATOR® or Microsoft's Internet Explorer, is a software application program for providing a user interface to the WWW. Using the web browser via a remote request, the web browser requests the desired hypertext document from the appropriate web server using the URL for the document and the HyperText Transport Protocol ("HTTP"). HTTP is a higher-level protocol than TCP/IP and is designed specifically for the requirements of the WWW. HTTP runs on top of TCP/IP to transfer hypertext documents and user-supplied form data between server and client computers. The WWW browser may also retrieve programs from the web server, such as JAVA applets, for execution on the client computer. Finally, the WWW browser may include optional software components, called plug-ins, that run specialized functionality within the browser.

Generally described, the present invention relates to a system and method for dynamically managing cached connections in a data network. More specifically, in an illustrative embodiment of the present invention, the present invention facilitates the dynamic management of cached data connections between a number of web server clients and data servers via an integrated data network. However, one skilled in the relevant art will appreciate that the present invention is illustrative in nature and should be not be construed as limiting.

Figure 1:
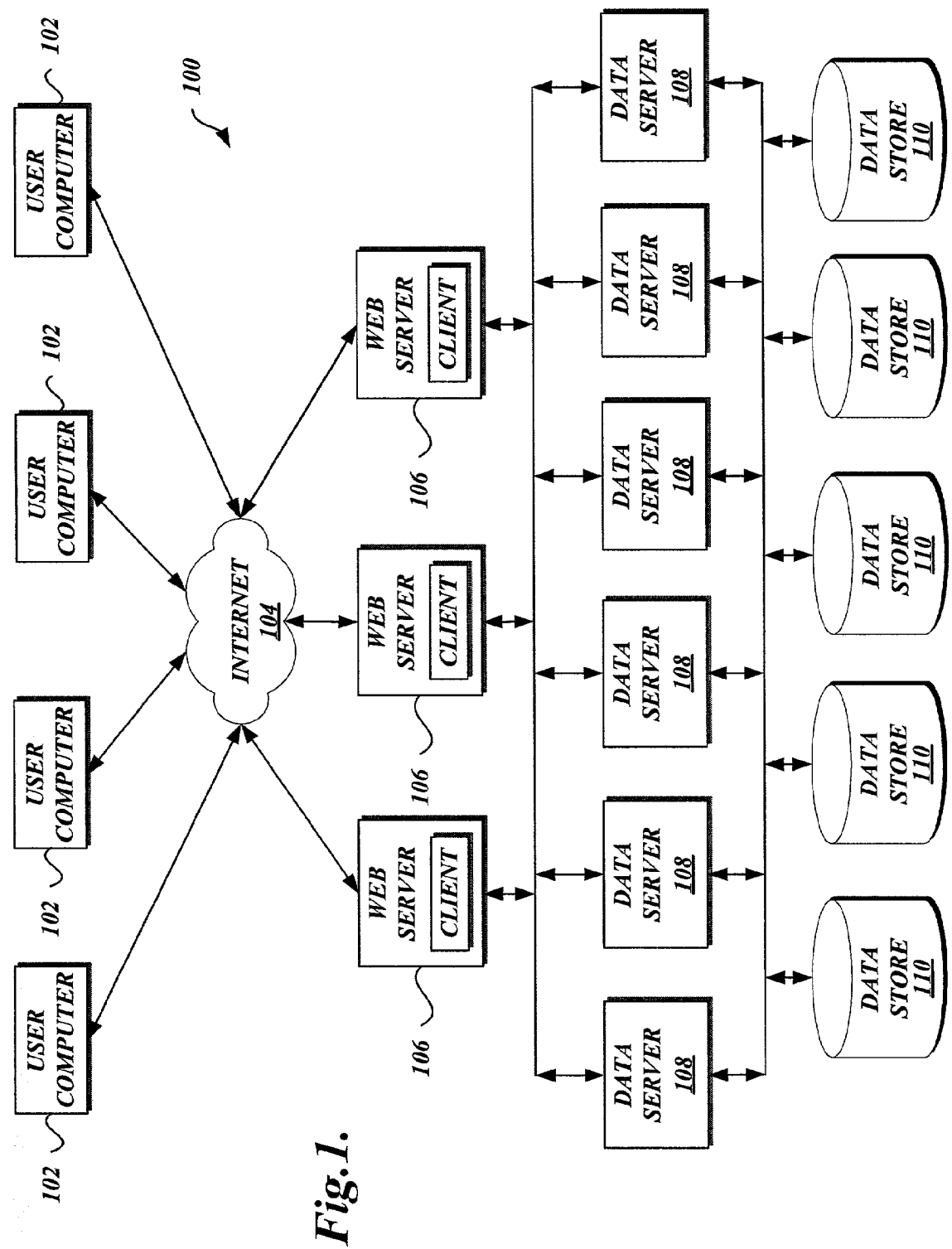
FIG. 1 is a block diagram of an integrated data network including a plurality of user computers, web server clients, data servers and data stores in accordance with the present invention.

With reference now to FIG. 1, an integrated data network 100 for implementing dynamic connection will be described. The integrated data network 100 includes a number of user computers 102 operable to generate requests for data over a global communication network, such as the Internet 104. In an illustrative embodiment of the present invention, the user computers 102 can include personal computing devices, hand-held devices, mobile devices, and the like that generate data requests relating to Web sites. Each data request can include identification information, such as a user identifier or user demographic information, for customizing the results of the data request.

In communication with the user computers 102 is a number of Web server clients 106 operable to process the user computer data requests and return requested content. In an illustrative embodiment of the present invention, one or more of the Web server clients 106 may be associated with a particular Web site or Web service provided by a common entity. For example, one or more Web server clients 106 may be configured to distribute financial content offered by the entity, while other Web server clients 106 may be configured to provide electronic mail content offered by the same entity. One skilled in the relevant art will appreciate that any one of a variety of content types may be offered by a Web server client 106 or group of Web server clients 106.

To facilitate customization of the content delivered to the user computers 102, the Web server clients 106 are in communication with a group of data servers 108 and data stores 110. In an illustrative embodiment of the present invention, the data servers 108 and data stores 110 store content related to particular user identifiers, such as a global user id ("GUID"). Based on the identifiers submitted with a data requests, the data servers 108 are operable to obtain personalized user data and return the personalized data to the Web server clients 106.

Although a limited number of user computers 102, Web server clients 106, data servers 108, and data stores 100 are illustrated in FIG. 1, one skilled in the relevant art will appreciate that the number and combination of components utilized in various integrated data networks may vary on the type of data and number of users.

Figure 2:
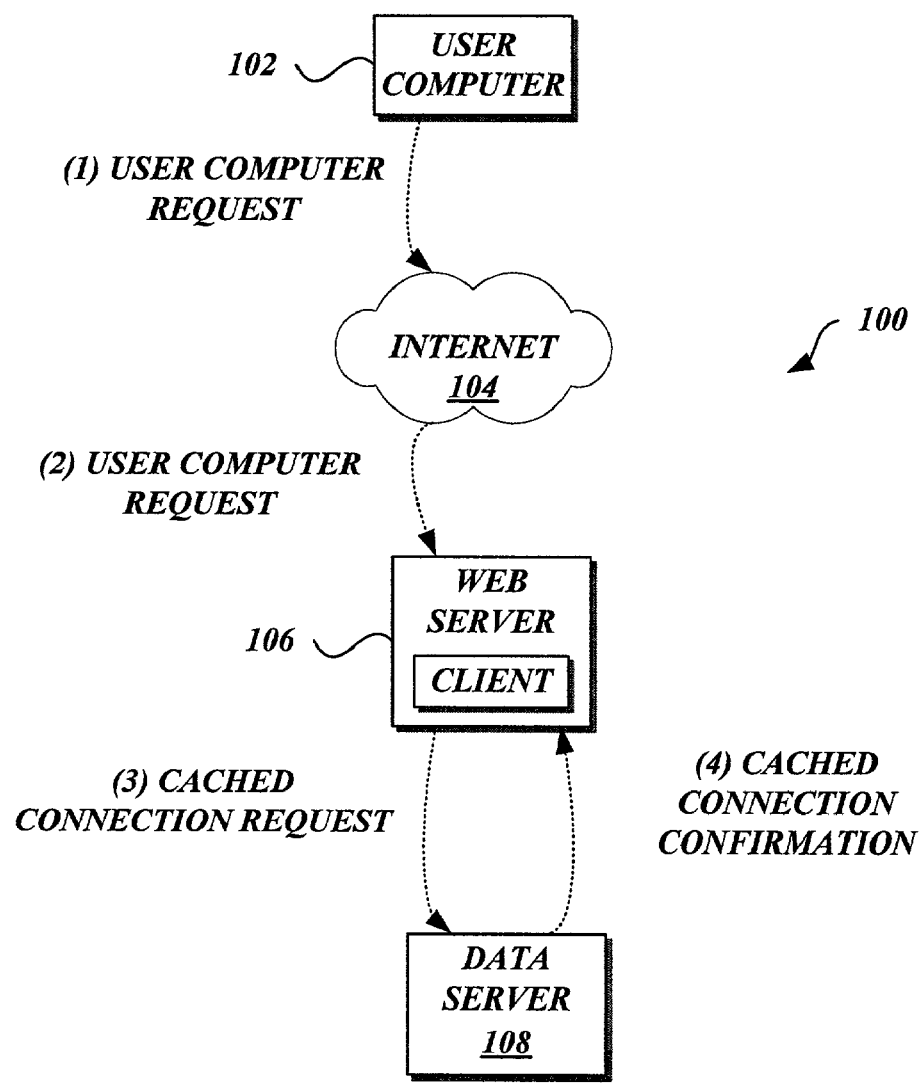
FIG. 2 is a block diagram of the integrated data network of FIG. 1 illustrating the initiation of a user computer request and the initiation of a web server and data server cache connection request in accordance with the present invention.
Figure 2:
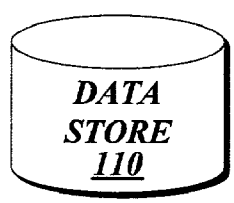

With reference now to FIGS. 2–5, the implementation of dynamic cache management will be described with relation to a portion of the integrated data network 100 (FIG. 1). With reference to FIG. 2, a user computer 102 initiates requests for content that are transmitted to the Web server client 106 via the Internet 104. In an illustrative embodiment of the present invention, the user computer request is in the form of Web site request. Additionally, the user computer request can include the transmission of user identifiers or user demographic information that will be utilized to customize content data. Alternatively, the user identifier and demographic information may be collected and transmitted to the Web server client 106 through the use of data files on the user computers 102, generally referred to as computer cookies.

To fulfill the user computer request, the Web server client 106 establishes a connection with a data server 108 corresponding to the user computer demographic information. As will be explained in greater detail below, the Web server client 106 may maintain schema for determining which data server 108 corresponds to a particular user identifier, such as a GUID. Additionally, in accordance with an aspect of the present invention, the Web server client 106 attempts to utilize a previously cached and unused connection with the data server 108. As illustrated in FIG. 2, if no cached connections are available, the Web server client 106 opens a new connection requests that the connection remain open via a connection cache. As will be also be explained in greater detail below, the data server 108 processes the cache connection request and transmits a corresponding answer to the Web server client 106.

Figure 3:
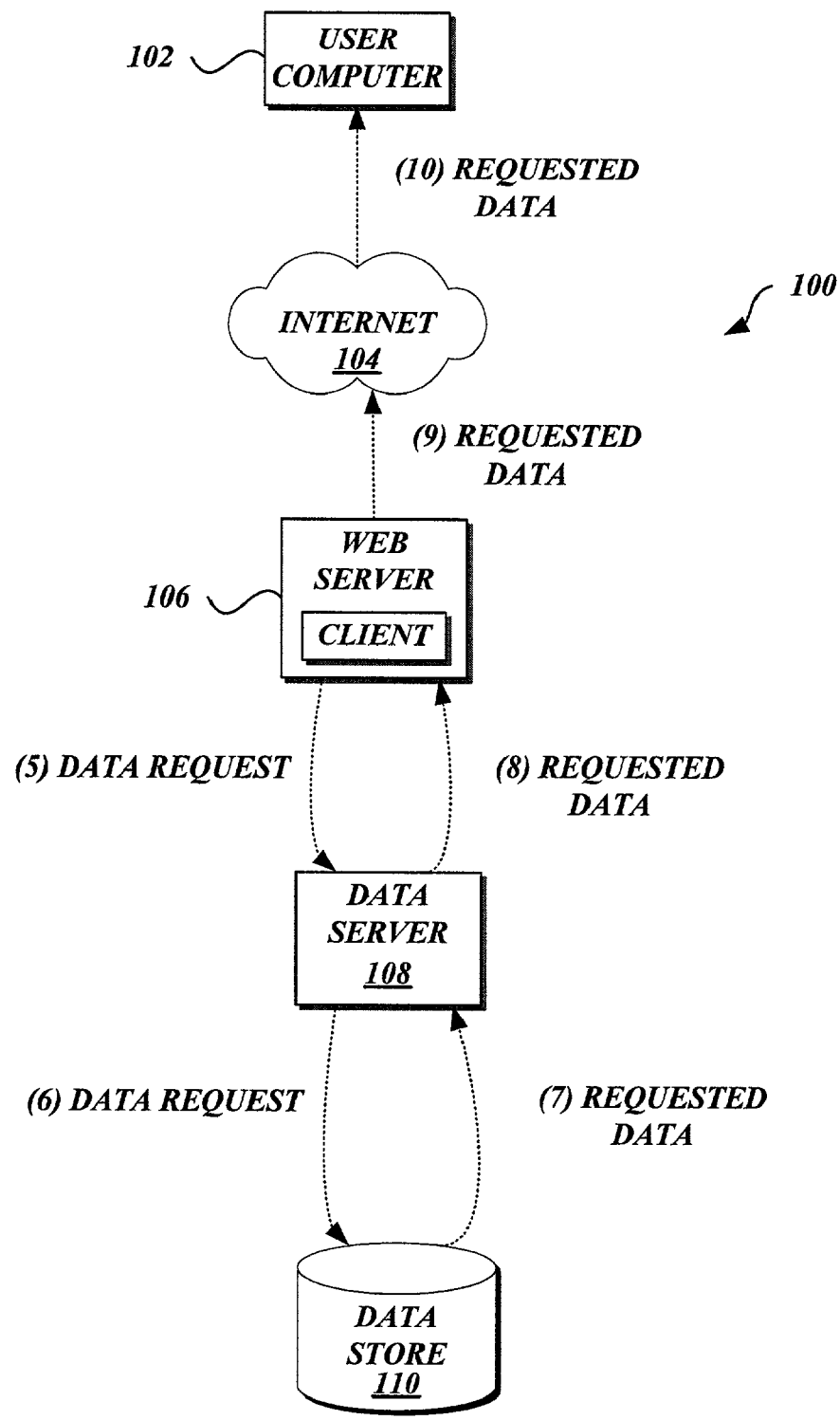
FIG. 3 is a block diagram of the integrated data network of FIG. 1 illustrating the processing of a web server client request in accordance with the present invention.

With reference now to FIG. 3, with the connection to the data server 108 open, the Web server client 106 transmits the data request to the data server 108. As illustrated in FIG. 3, the data server 108 processes the request and obtains the appropriate data from the data store 110. Alternatively, the data server 108 may maintain the more frequently requested data in a data cache and omit processing the request through the data store 110. The data server 108 transmits the requested data to the Web server 106. In turn, the Web server client 108 incorporates the personalized data into the content and delivers the requested content to the user computer 102.

Figure 4:
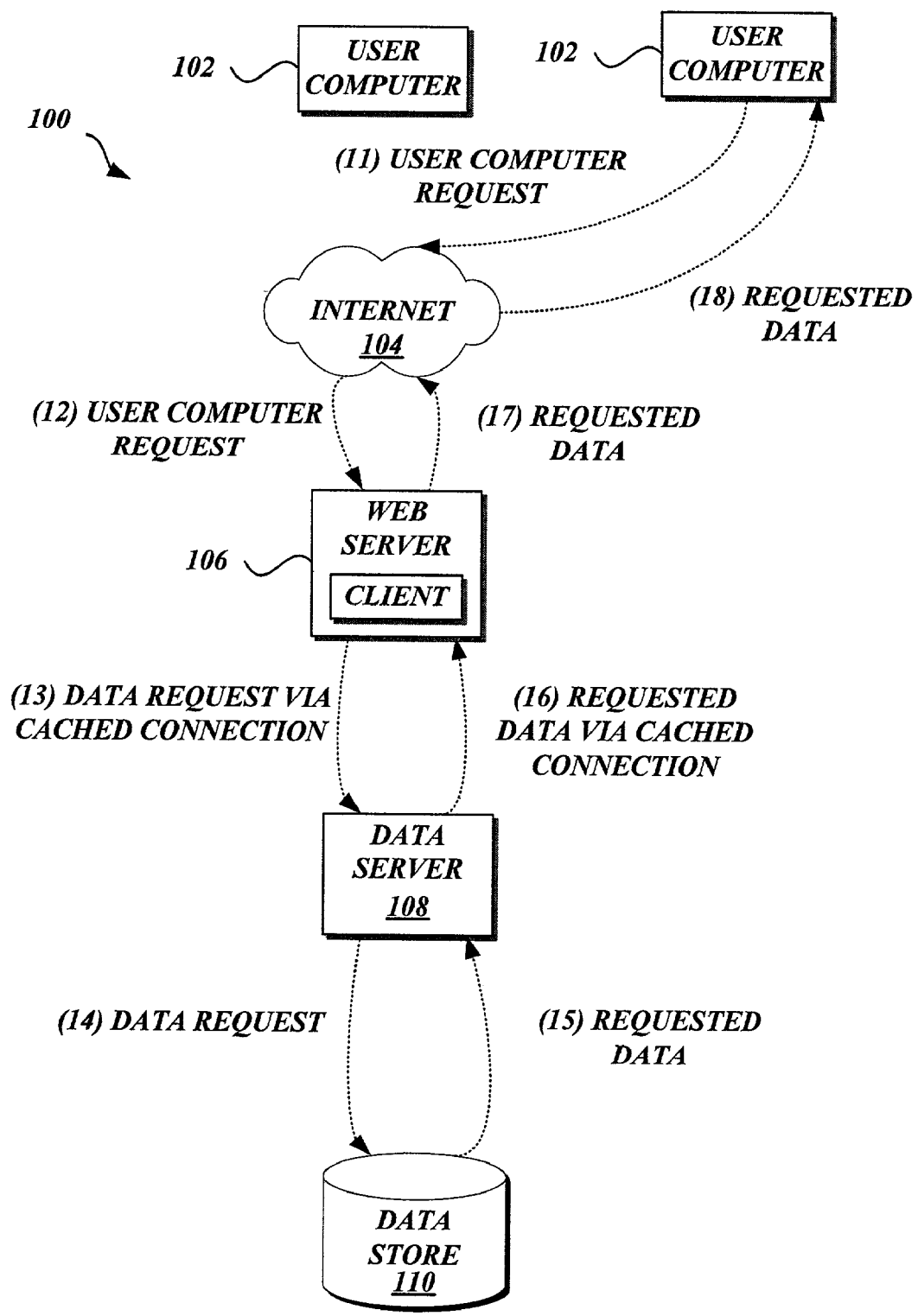
FIG. 4 is a block diagram of the integrated data network of FIG. 1 illustrating the processing of subsequent user computer and web server client requests via a cached connection in accordance with the present invention.

With reference now to FIG. 4, the same user computer 102 or another user computer 102 may issue a request to the Web server client 106 that corresponds to the same data server 108. In accordance with the present invention, the Web server client 106 connection has remained open and the Web server client request is serviced by the data server 108 via the cached connection. The cached connection has mitigated the need for Web server client 106 to utilize extra resources in connecting to the data server 108. Accordingly, the Web server client 106 completes the processing of the user computer request.

Figure 5:
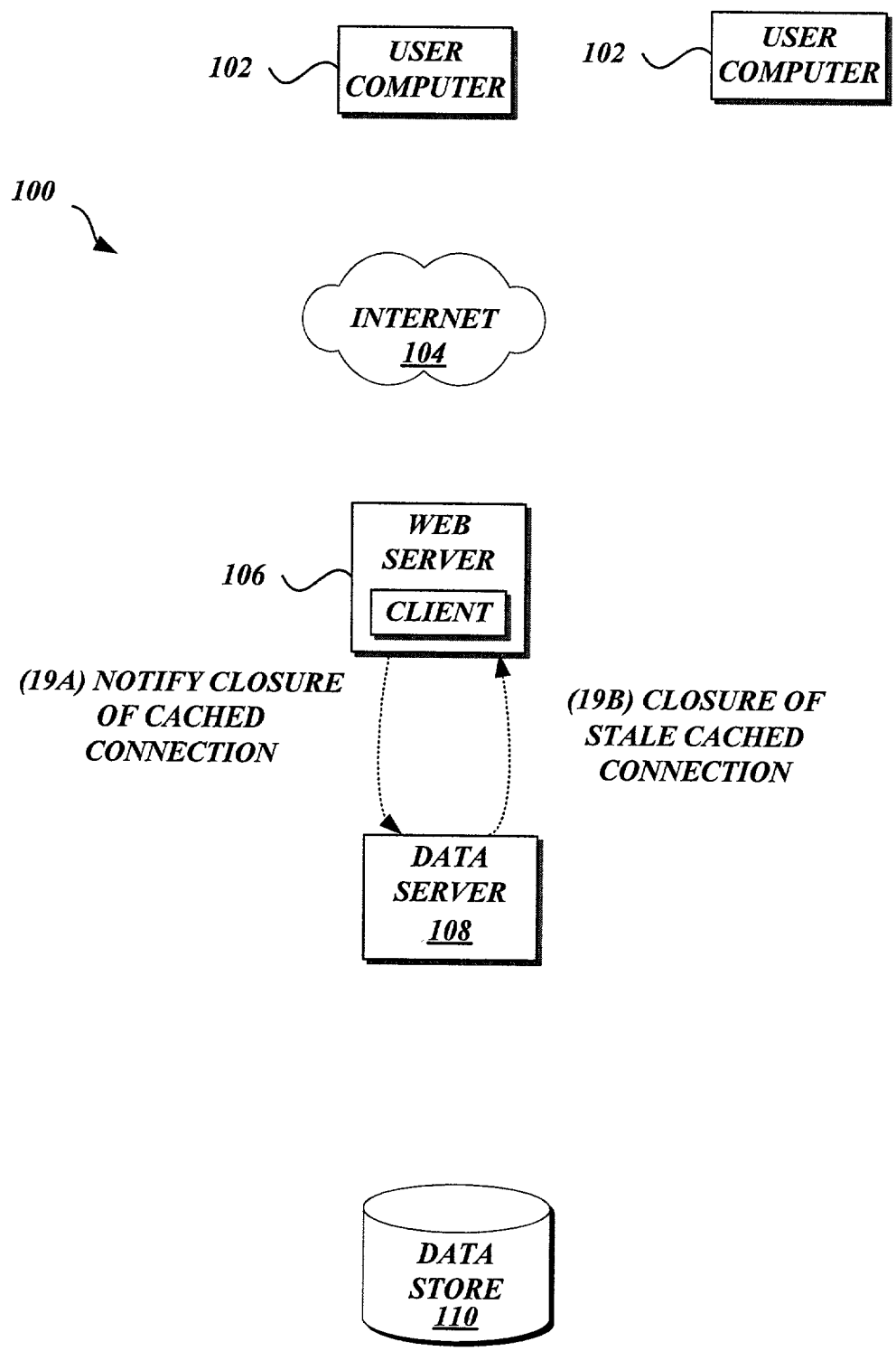
FIG. 5 is a block diagram of the integrated data network of FIG. 1 illustrating the termination of a web server and data server cache connection in accordance with the present invention.

With reference now to FIG. 5, in accordance with the present invention, cached connections between Web server clients 106 and data servers 108 may be terminated by either component. In one aspect, the Web server client 106 may terminate a cached connection based on an evaluation of criteria, such as a time limit for unused connections. In another aspect, the data server 108 may also terminate a cached connection based on an evaluation of criteria, such as a designation of a connection as stale.

Figure 6A:
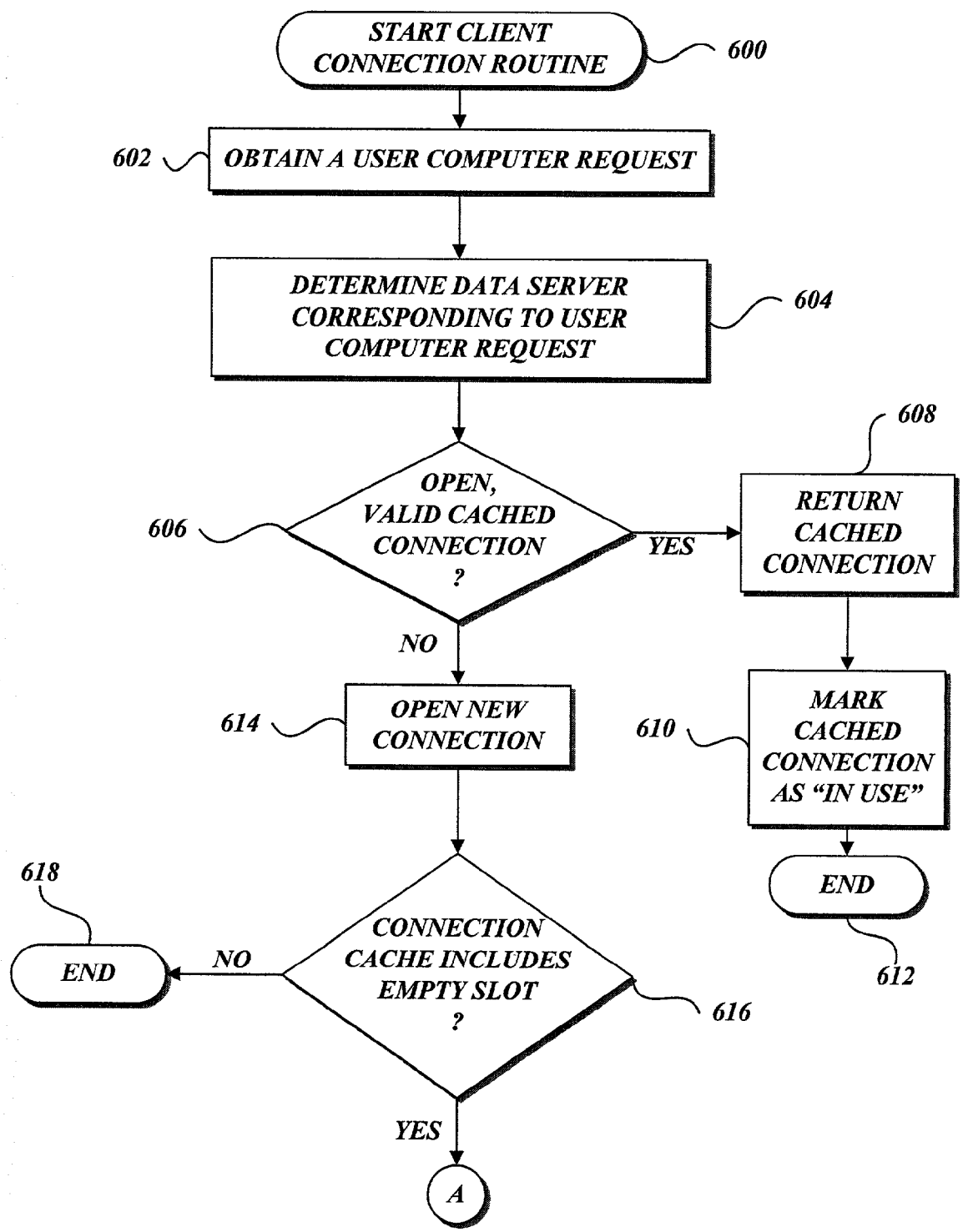
FIGS. 6A and 6B are flow diagrams illustrative of a data server connection routine implemented by a web server client in accordance with the present invention.
Figure 6B:
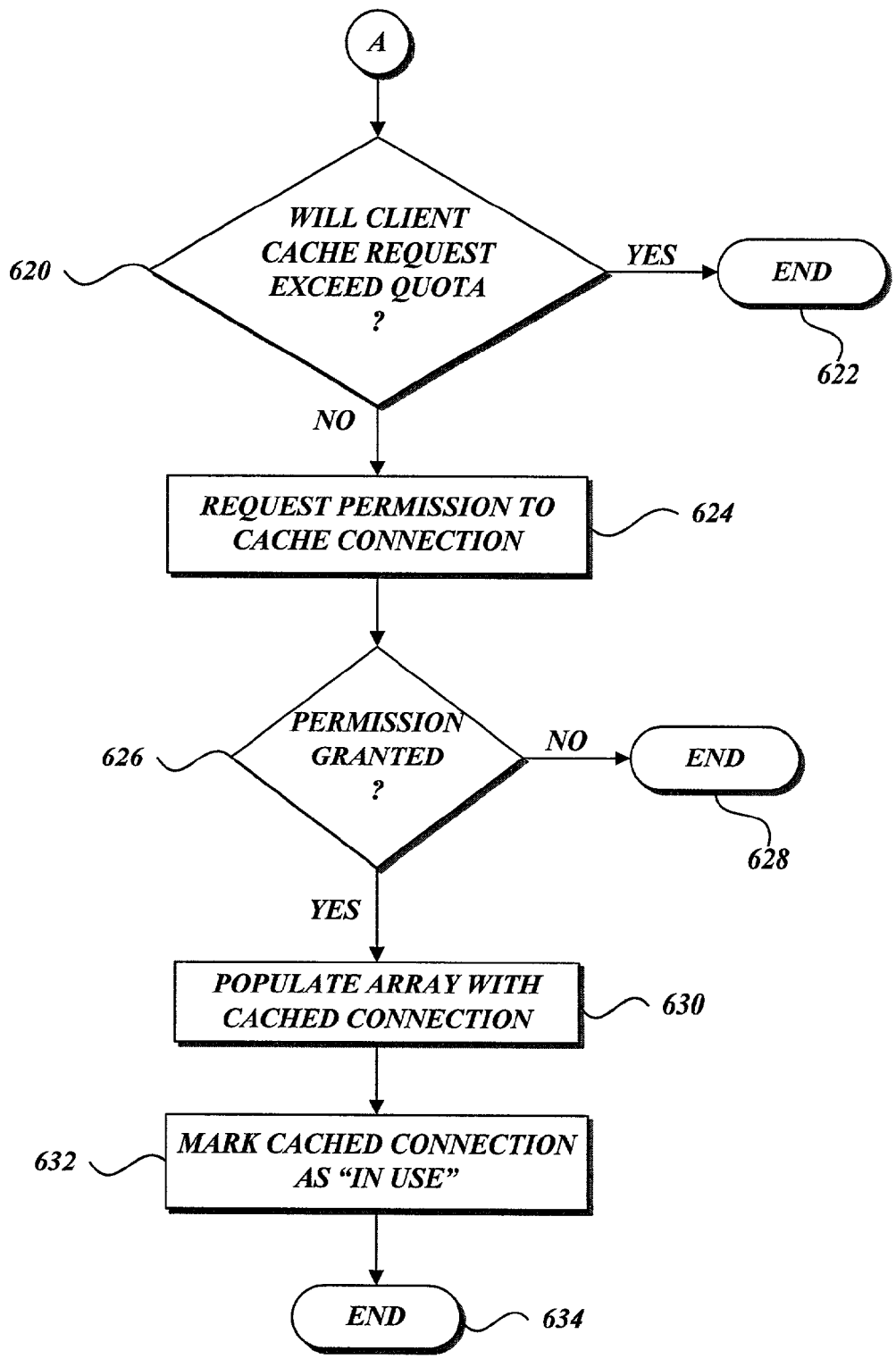

With reference now to FIGS. 6A and 6B, a routine 600 implemented by a Web server client 106 for establishing a cached connection with a data server 108 will be described. With reference to FIG. 6A, at block 602, the Web server client 106 obtains a user request. In an illustrative embodiment of the present invention, the user computer request is directed toward a Web server client 106 configured to provide the requested content. For example, the Web server client 106 may correspond to a particular URL. Additionally, if multiple Web server clients 106 correspond to a particular subject matter, the request may be allocated as part of distributed processing implementation. The user computer request can include identification information, such as a GUID and/or user demographic information, that will allow the Web server client 106 to customize the requested content. For example, a particular GUID may allow the Web server client 106 to customize content to a particular geographic area by zip code or by the gender of a user associated with a GUID. One skilled in the relevant art will appreciate that a number of demographic criteria may be utilized to customize user computer requested content.

At block 604, the Web server client 106 determines a data server 108 that corresponds to the user request. In an illustrative embodiment of the present invention, the group of data servers 108 maintains all user information in a distributed manner such that particular data servers are optimized to process particular user data requests. For example, the data servers 108 may include a master data server operable to organize storage of data among group of data servers. To allow the Web server clients 106 to determine which data server corresponds to a particular GUID, each Web server 106 maintains a schema for describing the organization of the data among the data servers 108. The schema includes an identification of each data server 108 and a table for correlating various GUIDs to the data servers 108.

At decision block 606, a test is conducted to determine whether a valid, unused cached connection exists. FIG. 7 is a block diagram illustrative of a cache connection array 700 utilized by the Web server client 106 to manage cache connections with data servers 108 in accordance with the present invention. In an illustrative embodiment of the present invention, the Web server client 106 maintains a 32-element cache connection array 700 for each data server 108 in the integrated data network 100. The array 700 includes a socket identification portion 702 for identifying individual connection sockets with the data server 108. Additionally, the array 700 includes a use portion 704 for indicating whether the particular connection socket is being utilized. Further, the array 700 can include a time portion 706 for indicating the last time a connection socket was utilized by the Web server client 106. In one embodiment of the present invention, the array 700 maintains a limited number of connection sockets with a particular data server 108. The threshold level may be maintained by the Web server client 106 or may be maintained as part of a centralized Web server client configuration management.

Returning to FIG. 6A, if the array 700 indicates that there is an unused connection socket, the Web server client 106 obtains connects to the data server 108 via the connection socket identification at block 608. At block 610, the Web server client 106 marks the corresponding entry in the array 700 as "in use." In an illustrative embodiment of the present invention, the use portion 704 of the array 700 is processed as a single bit to indicate in use. At block 612, the routine 600 terminates and the Web server client 106 can utilize the cache connection to obtain the user computer data.

With reference again to decision block 606, if the array 700 indicates that there is not a valid, unused connection socket, at block 614, the Web server client 106 opens a new socket connection with the data server 108. At decision block 616, a test is conducted to determine whether there are any empty connection slots in the array 700. In an illustrative embodiment of the present invention, the Web server client 106 may have a limited number of cached connections that it can manage. Accordingly, if the array 700 does not include any empty slots, the Web server client 106 will not request any additional cached connections. Alternatively, the Web server client 106 may not have a maximum number of cached connections and decision block 616 may be omitted. If the maximum number of cached connections has been reached, the routine 600 terminates at block 618 and the Web server client 106 can utilize the new connection (block 614) to obtain the user computer data.

With reference now to FIG. 6B, if the array 700 includes at least one empty slot at decision block 616 (FIG. 6A), at decision block 620, a test is conducted to determine whether a Web server client 106 cache request will exceed a quota for cached connections. In an illustrative embodiment of the present invention, the Web server client 106 may maintain additional quotas for cached connections. The quotas may be a fixed number of connections that the Web server client 106 may maintain. Alternatively, the quotas may be a dynamic number of cached connections dependent on certain conditions, including, but not limited to, the number of total cached connections, the time of day, the requesting user computer 102. Additionally, the quotas may be provided by a data server 108, such as the master data server, provided by a central Web server client controller, and/or generated by each individual Web server client 106. If a quota will be exceeded by a cache request, the routine 600 terminates at block 622 and the Web server client 106 can utilize the new connection (block 614) to obtain the user computer data.

If a Web server client cache request will not exceed a quota, at block 624, the Web server client 106 requests permission from the data server 108 to cache the new connection. At decision block 626, a test is conducted to determine whether permission has been granted to cache the connection socket. If permission is not granted, the routine 600 terminates at block 628 and the Web server client 106 can utilize the new connection (block 614) to obtain the user computer data. Alternatively, if permission is granted, at block 630, the Web server client 106 populates the array 700 (FIG. 7) with information corresponding the new connection and marks the connection as "in use" at block 632. At block 634, the routine 600 terminates and the Web server client 106 can utilize the new cached connection to obtain the user computer data.

Figure 8:
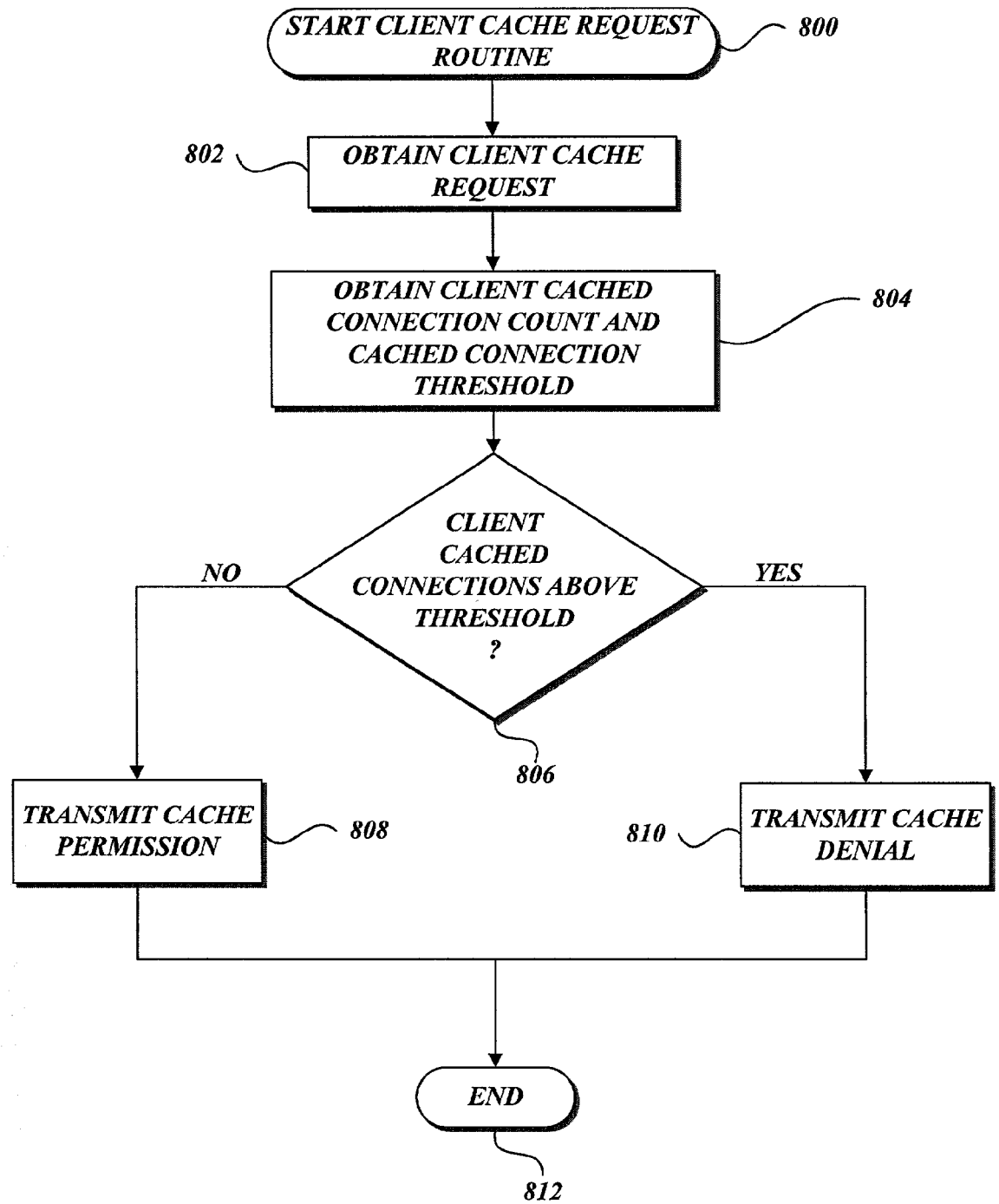
FIG. 8 is a flow diagram illustrative of a web server client cache connection request processing routine implemented by a data server in accordance with the present invention.

With reference again to decision block 626 (FIG. 6), FIG. 8 is a flow diagram illustrative of a routine 800 implemented by a data server 108 to process a Web server client 106 cache connection request in accordance with the present invention. At block 802, the data server 108 obtains the Web server client request. At block 803, the data server 106 obtains the current Web server client cached connection count and a cache connection threshold for the Web server client 106. In an illustrative embodiment of the present invention, the data server 108 can maintain a fixed threshold for the number of cached connections allotted to a particular Web server client 106. In another embodiment of the present invention, the data server 108 may dynamically allocate cached connections based on a number of criteria.

In one aspect, the data server 108 may allocate cached connections based upon a time condition. For example, if the Web server client 106 relates to a teen chat room service, the data server 108 may allocate more cached connections during the afternoon (e.g., corresponding to after school) than in them morning. Likewise, the data server 108 may allocate more connections during the summer months than during the traditional in-school months. In another aspect, the data server 108 may allocate cached connections based upon financial criteria. For example, a service associated with the data server 108 may charge a service fee for the number of cached connections provided by the data server. In still another aspect, the data server 108 may allocate cached connection based upon performance guarantees. For example, a service associated with the data server 108 may provide specific performance guarantees in terms of the number of request processed over a given time period. Accordingly, the data server 108 may allocate a different number of cached connections depending on the cumulative performance for the particular Web server client 106. One skilled in the relevant art will appreciate that one or more additional or alternative criteria may be incorporated into the data server determination. Additionally, the data server 108 may combine the criteria.

At decision block 806, a test is conducted to determine whether the number of requested client cache connections would be above the threshold. If the requested number of cache connections are not above the threshold, the device server 108 transmits a cache permission to the requesting Web server client 106 at block 808. Alternatively, if the requested number of cache connections are above the threshold, the device server 108 transmits a cache denial to the requesting Web server client 106 at block 810. At block 812, the routine 800 terminates.

Figure 9:
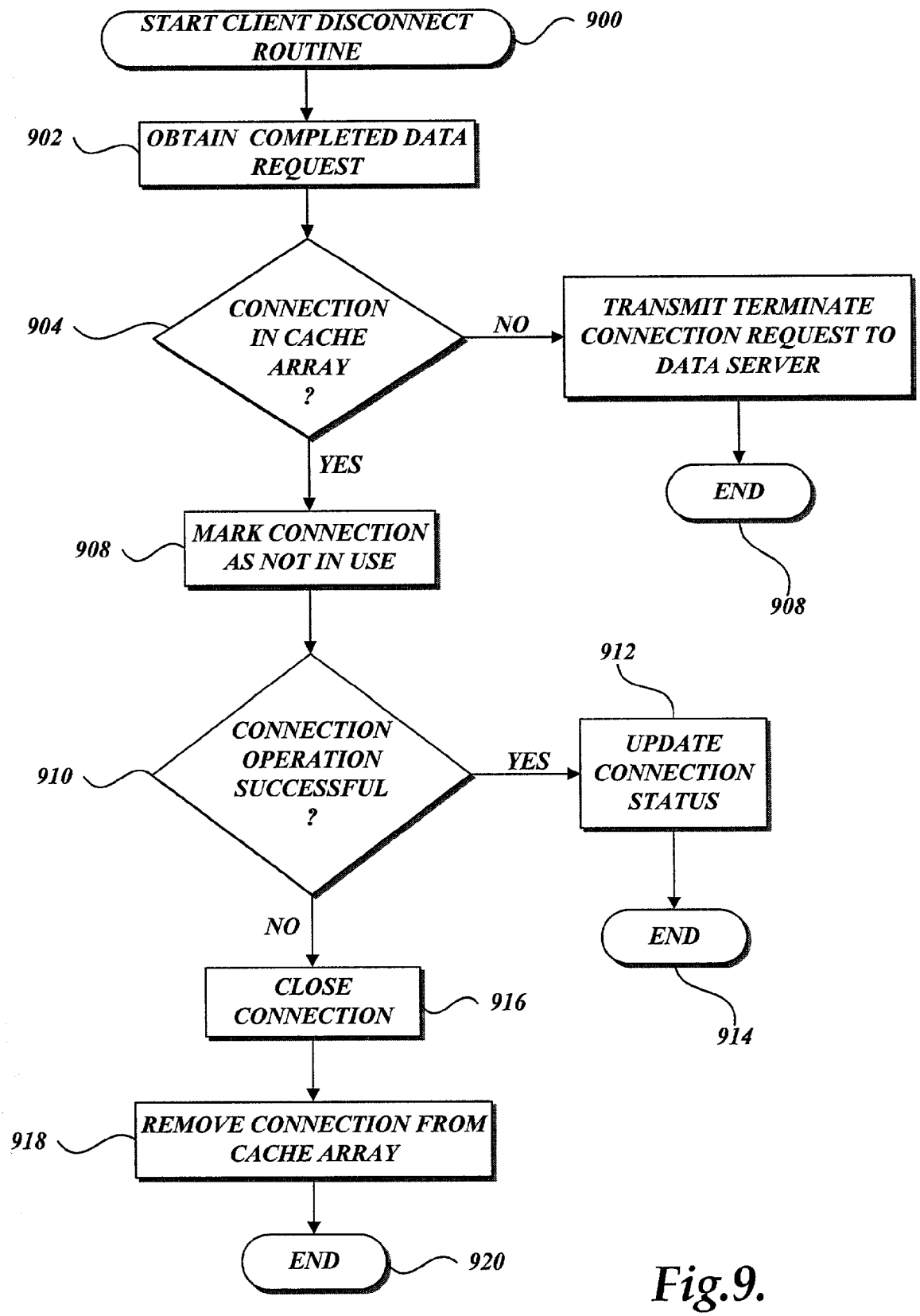
FIG. 9 is a flow diagram illustrative of a data server connection termination routine implemented by a web server client in accordance with the present invention.

In addition to the creation of the cached connections, in accordance with another aspect of the present invention, the Web server client 106 may also maintain cached connection in between data requests. With reference now to FIG. 9, a routine 900 implemented by a Web server client 106 after completing a data request will be described. At block 902, the Web server client 106 obtains a completed data request from the data server 108. At decision block 904, a test is conducted to determine whether the socket connection utilized to complete the data request was in the cache array 700 (FIG. 7). If the connection was not in the cache array, at block 906, the Web server 106 transmits a terminate connection request to the data server 106 and the routine 900 terminates at block 908.

If the connection was in the cache array, at block 910, the Web server client 106 designates the corresponding entry in the cache array 700 as not in use. In an illustrative embodiment of the present invention, the Web server client 106 can manipulate the use portion 704 of the array 700 (FIG. 7). At decision block 912, a test is conducted to determine whether the previous transaction over the connection socket was successful. In an illustrative embodiment of the present invention, the data server 108 may have experienced problems preventing the completion of the data request. Additionally, the connection socket may otherwise have some problems associated that prevented a successful transfer of user computer data to the Web server client 106. If the previous transaction was successful, at block 914, the Web server client 106 updates the connection status. In an illustrative embodiment of the present invention, the Web server client 106 may update the time portion 706 (FIG. 7) of the cache array 700 to indicate the last time the cache connection was utilized. At block 916, the routine 900 terminates.

If at decision block 916, the transaction operation was not successful, at block 918, the Web server client 106 closes the socket connection. At block 920, the Web server client 106 removes the connection from the cache connection array 700. At block 922, the routine 900 terminates.

Figure 10:
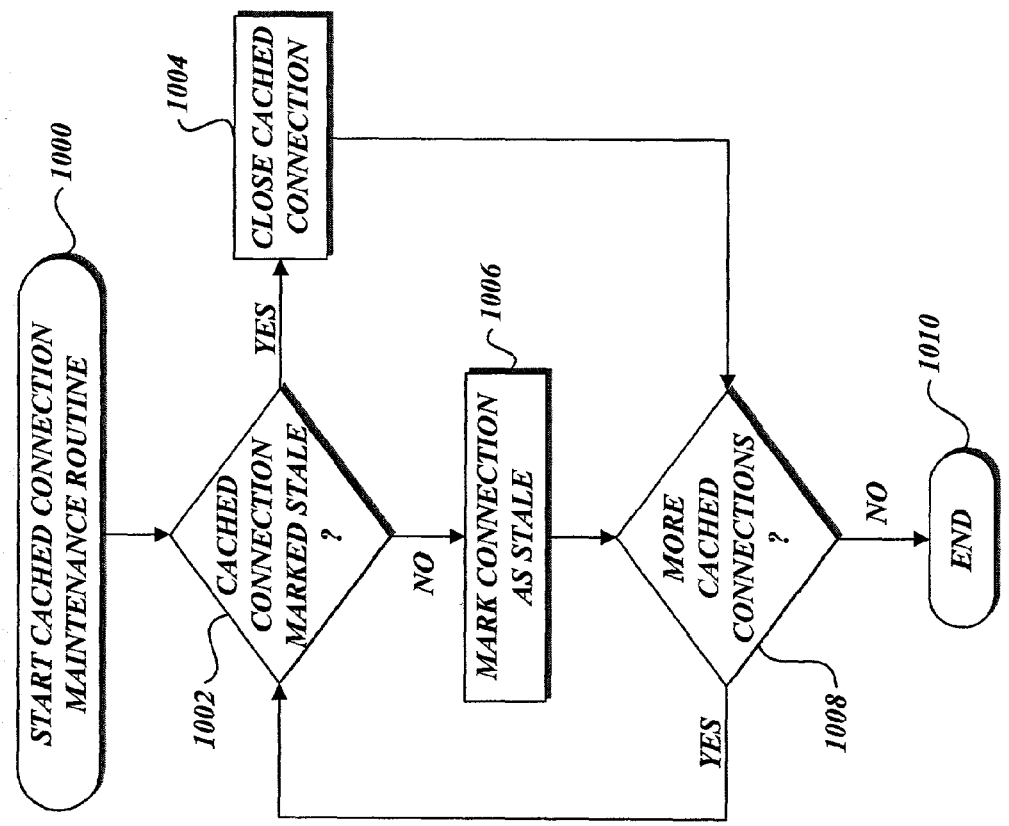
FIG. 10 is a flow diagram illustrative of cached connection maintenance routine implemented by a data server in accordance with the present invention.

In accordance with another aspect of the present invention, cached connections may be also be terminated by the device server 108 and/or the Web server client 106. With reference to FIG. 10, a routine 1000 implemented by the device server 108 for maintaining cached connections will be described. At decision block 1002, a test is conducted to determine whether a first cached connection has been listed as stale. In an illustrative embodiment of the present invention, the device server 108 may maintain a table of all cached socket connections, similar to the array 700 (FIG. 7) maintained by the Web server client that includes a portion for designating stale connections as will be described below. If the connection has been designated as stale, at block 1004, the device server 108 terminates the connection and the routine 1000 proceeds to decision block 1008, which will be described in greater detail below.

If the current cached connection has not been listed as stale, at block 1006, the device server 106 lists the connection as stale. In an illustrative embodiment of the present invention, the device server 108 will remove the stale indication each time a data request is received over the cached socket connection. Accordingly, the stale designation assigned at block 1006 will remain for those socket connections that have not been utilized in subsequent processings of routine 1000. At decision block 1008, a test is conducted to determine whether there are additional cached connections. If there are additional cached connections, the routine 1000 returns to decision block 1002. Alternatively, if there are no additional cached connections, the routine 1000 terminates at block 1010.

In an illustrative embodiment of the present invention, the device server 108 runs the maintenance routine 1000 on frequent time intervals. For example, the device server 108 may run the maintenance routine 1000 every five minutes. Alternatively, the device server 108 may run the maintenance routine 1000 after another condition has been met. For example, the routine 1000 may be run after a threshold number of cached connections have been initiated. Additionally, the routine 1000 may be run at certain times of the day.

Figure 11:
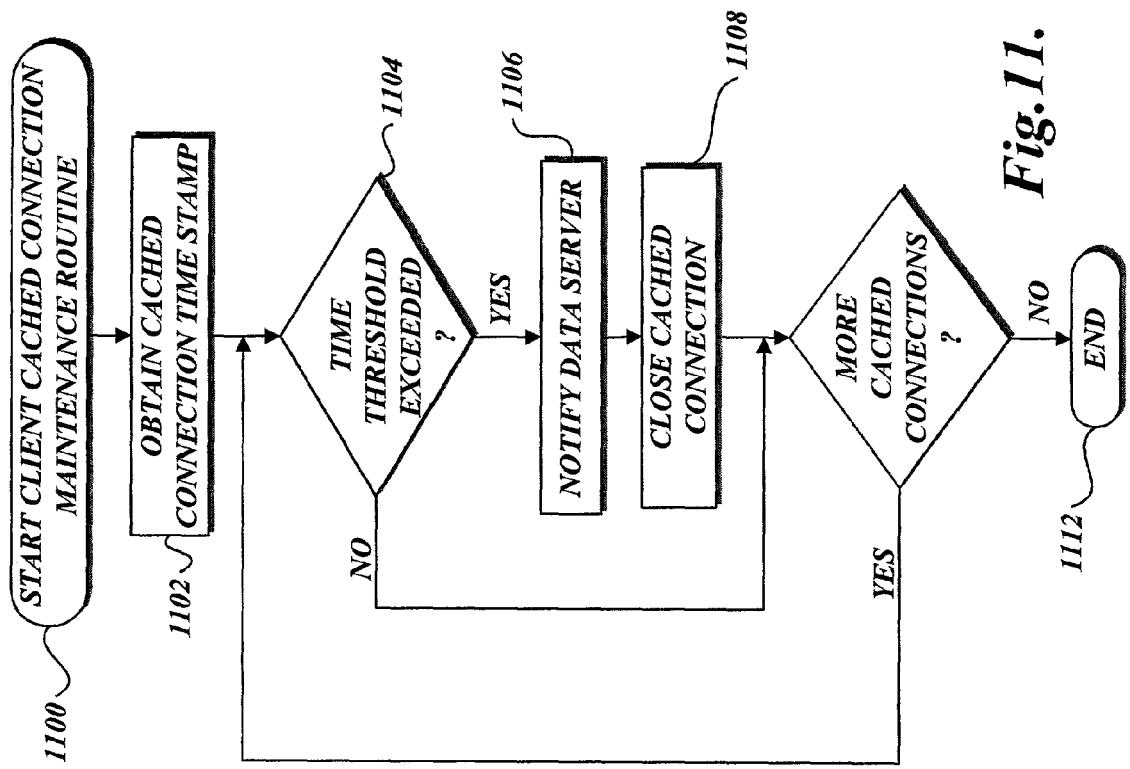
FIG. 11 is a flow diagram illustrative of a cached connection maintenance routine implemented by a web server client in accordance with the present invention.

With reference now to FIG. 11, a routine 1100 implemented by the Web server client 106 for maintaining cached connections will be described. At block 1102, the Web server client 106 obtains cache connection time stamp information. In an illustrative embodiment of the present invention, the time stamp information is maintained in the time portion 706 of the array 700 (FIG. 7). At decision block 1104, a test is conducted to determine where a time threshold has been exceeded. In an illustrative embodiment of the present invention, the Web server client 106 can include fixed time threshold for non-use of cached socket connections. Additionally, in one embodiment of the present invention, the time threshold may be dependent on additional conditions such as utilization rates of the Web server client 106 (how many user computer requests are being processed), a time of day, and the like. If the time threshold has not been exceeded, the routine 1100 proceeds to decision block 1110, which will be described below.

If at decision block 1104 the time threshold has not been exceeded, at block 1106, the Web server client 106 notifies that data server 108. At block 1108, the cache connection is closed. At decision block 1110, a test is conducted to determine whether there are any additional cache connections in the cache array 700. If there are additional cached connections, the routine 1100 returns to decision block 1102. Alternatively, if there are no additional cached connections, the routine 1100 terminates at block 1012.

In an illustrative embodiment of the present invention, the Web server client 106 runs the maintenance routine 1100 on frequent time intervals. For example, the Web server client 106 may run the maintenance routine 1100 every two minutes. In an illustrative embodiment of the present invention, the Web server client 106 may initiate routine 1100 (FIG. 11) on shorter time intervals than the device server 108 initiates routine 1000 (FIG. 10). Accordingly, the Web server client 106 and the device server 108 may coordinate the timing of the maintenance routine. Additionally, the Web server client 106 may run the maintenance routine 1100 after another condition has been met. For example, the routine 1100 may be run after a threshold number of cached connections have been initiated. Additionally, the routine 1100 may be run at certain times of the day.

While illustrative embodiments of the invention have been illustrated and described, it will be appreciated that various changes can be made therein without departing from the spirit and scope of the invention.

The invention claimed is:

1. In an integrated data network including one or more client computing devices in communication with one or more data servers, a method for managing persistent communication connections between a client computing device and a data server, the method comprising:

obtaining a request to establish a persistent communication channel;

calculating a number of persistent communication channels including any existing persistent communication channels and the requested persistent communication channel;

determining whether the number of requested persistent communication channels will exceed a threshold number of persistent communication channels between the data server and the client computing device; and establishing a persistent communication channel if the requested persistent communication channel will not exceed the threshold number of persistent communication channels.

2. The method as recited in claim 1, wherein determining whether the requested persistent communication channel will exceed a threshold number of persistent communication channels between the data server and the client computing device includes comparing the requested number of persistent communication channels to a fixed threshold number of persistent communication channels between the data server and the client computing device.

3. The method as recited in claim 1, wherein determining whether the requested persistent communication channel will exceed a threshold number of persistent communication channels between the data server and the client computing device includes comparing the requested number of persistent communication channels to a dynamic threshold number of persistent communication channels between the data server and the client computing device.

4. The method as recited in claim 3, wherein the dynamic threshold number of persistent communication channels is based upon a time of day.

5. The method as recited in claim 3, wherein the dynamic threshold number of persistent communication channels is based upon financial criteria.

6. The method as recited in claim 3, wherein the dynamic threshold number of persistent communication channels is based upon usage criteria.

7. The method as recited in claim 1 further transmitting a notification corresponding to whether the requested persistent communication channel will be established.

8. The method as recited in claim 1, wherein the integrated data network includes a second client computing device in communication with the data server, the method further comprising:
  obtaining a request to establish a persistent communication channel with the second client computing device;
  calculating a number of persistent communication channels including any existing persistent communication channels and the requested persistent communication channel for the second client computing device;
  determining whether the number of requested persistent communication channels will exceed a threshold number of persistent communication channels between the data server and the client computing device; and
  establishing a persistent communication channel with the second client computing device if the requested persistent communication channel will not exceed the threshold number of persistent communication channels.

9. The method as recited in claim 8, wherein determining whether the requested persistent communication channel will exceed a threshold number of persistent communication channels between the data server and the client computing device includes comparing the requested number of persistent communication channels to a fixed threshold number of persistent communication channels between the data server and the client computing device.

10. The method as recited in claim 8, wherein determining whether the requested persistent communication channel will exceed a threshold number of persistent communication channels between the data server and the client computing device includes comparing the requested number of persistent communication channels to a dynamic threshold number of persistent communication channels between the data server and the client computing device.

11. The method as recited in claim 1 further comprising:
  determining whether a persistent communication channel is stale; and
  terminating the persistent communication channel if the communication channel is stale.

12. The method as recited in claim 1, wherein determining whether the persistent communication channel is stale includes determining whether the persistent communication channel has transmitted data within a period of time.

13. The method as recited in claim 1, wherein the client computing device is a Web server client.

14. A computer-readable medium having computer-executable instructions for performing the method recited in claim 1.

15. An integrated data network for managing persistent communication channels, the integrated data network comprising:
  one or more client computing devices operable to generate data requests corresponding to an identifiable set of data over a communication channel; and
  one or more data servers, in communication the one or more client computing devices, and operable to process the client computing device requests according to the identifiable set of data;
  wherein the one or more client computing devices are further operable to request a communication channel with a data server remain persistent; and
  wherein the one or more data servers are further operable to calculate a number of persistent communication channels including any existing persistent communication channels and the requested persistent communication channel, determine whether the number of persistent communication channels will exceed a threshold number of persistent communication channels, establish a persistent communication channel if the number of persistent communication channels will not exceed a threshold number of persistent communication channels.

16. The integrated data network as recited in claim 15, wherein the threshold number of communication channels is a fixed threshold number of persistent communication channels between the data server and the client computing device.

17. The integrated data network as recited in claim 15, wherein the threshold number of communication channels is a dynamic threshold number of persistent communication channels between the data server and the client computing device.

18. The integrated data network as recited in claim 17, wherein the dynamic threshold number of persistent communication channels is based upon a time of day.

19. The integrated data network as recited in claim 17, wherein the dynamic threshold number of persistent communication channels is based upon financial criteria.

20. The integrated data network as recited in claim 17, wherein the dynamic threshold number of persistent communication channels is based upon usage criteria.

21. The integrated data network as recited in claim 15, wherein the one or more data servers are further operable to transmit a notification corresponding to whether the requested persistent communication channel will be established.

22. The integrated data network as recited in claim 15 further comprising a second client computing device in communication with the data server, wherein at least one of the one or more data servers is further operable to calculate a number of persistent communication channels for the second client computing device including any existing persistent communication channels and the requested persistent communication channel, determine whether the number of persistent communication channels will exceed a threshold number of persistent communication channels, establish a persistent communication channel with the second client computing device if the number of persistent communication channels will not exceed a threshold number of persistent communication channels.

23. The integrated data network as recited in claim 15, wherein the client computing device is a Web server client.

24. In an integrated data network including one or more client computing devices in communication with one or more data servers, a method for managing cached communication connections between a client computing device and a data server, the method comprising:

issuing, by the client computing device, a request to establish a cached communication channel;

obtaining, by the data server, the request to establish a cached communication channel;

calculating, by the data server, a number of cached communication channels including any existing cached communication channels and the requested cached communication channel;

determining, by the data server, whether the number of requested cached communication channels will exceed a threshold number of cached communication channels between the data server and the client computing device; and transmitting, by the data server, a notification of a granted cached communication channel if the number of requested cached communication channels will not exceed a threshold number of cached communication channels between the data server and the client computing device.

25. The method as recited in claim 24, wherein determining whether the requested cached communication channel will exceed a threshold number of cached communication channels between the data server and the client computing device includes comparing the requested number of cached communication channels to a fixed threshold number cached communication channels between the data server and the client computing device.

26. The method as recited in claim 24, wherein determining whether the requested cached communication channel will exceed a threshold number of cached communication channels between the data server and the client computing device includes comparing the requested number of cached communication channels to a dynamic threshold number of cached communication channels between the data server and the client computing device.

27. The method as recited in claim 26, wherein the dynamic threshold number of cached communication channels is based upon a time of day.

28. The method as recited in claim 26, wherein the dynamic threshold number of cached communication channels is based upon financial criteria.

29. The method as recited in claim 26, wherein the dynamic threshold number of cached communication channels is based upon usage criteria.

30. The method as recited in claim 1, wherein the integrated data network includes a second client computing device in communication with the data server, the method further comprising:

obtaining, by the data server, a request to establish a cached communication channel with the second client computing device;

calculating, by the data server, a number of cached communication channels including any existing cached communication channels and the requested cached communication channel for the second client computing device;

determining, by the data server, whether the number of requested cached communication channels will exceed a threshold number of cached communication channels between the data server and the client computing device; and transmitting, by the data server, a notification to the second computing device of a granted cached communication channel if the number of requested cached communication channels will not exceed a threshold number of cached communication channels between the data server and the second client computing device.

31. The method as recited in claim 24, wherein the client computing device is Web server client.

* * * * *